J. B. McKIEL.
HEADLIGHT FOR AUTOMOBILES.
APPLICATION FILED OCT. 26, 1911.

1,024,411.

Patented Apr. 23, 1912.
3 SHEETS—SHEET 1.

Witnesses

J. B. McKiel Inventor by Attorneys

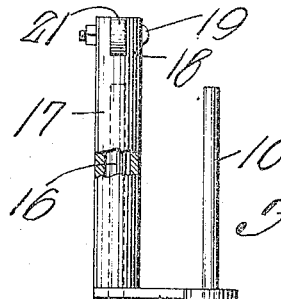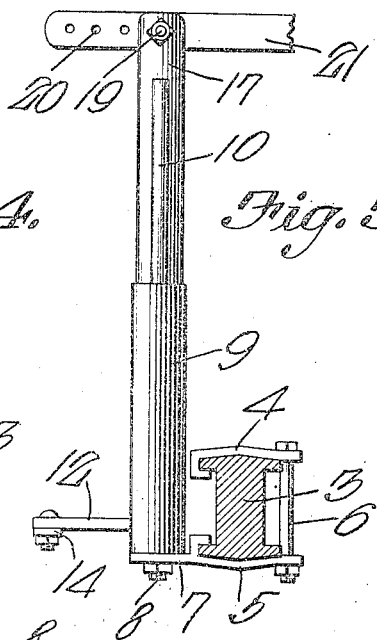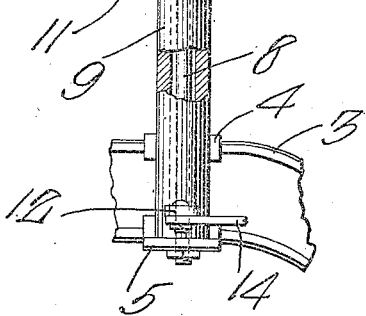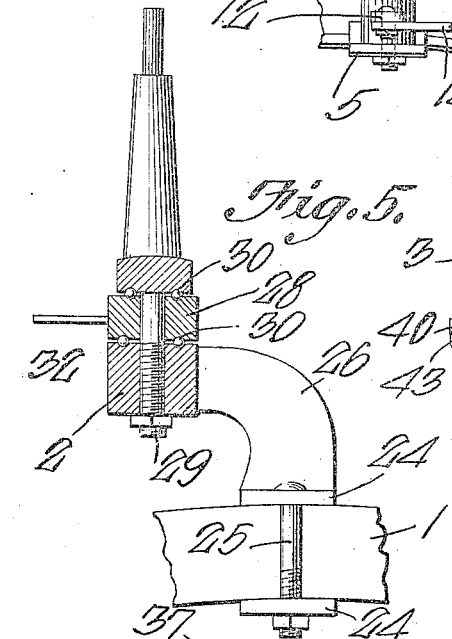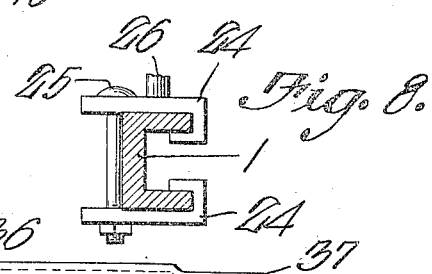

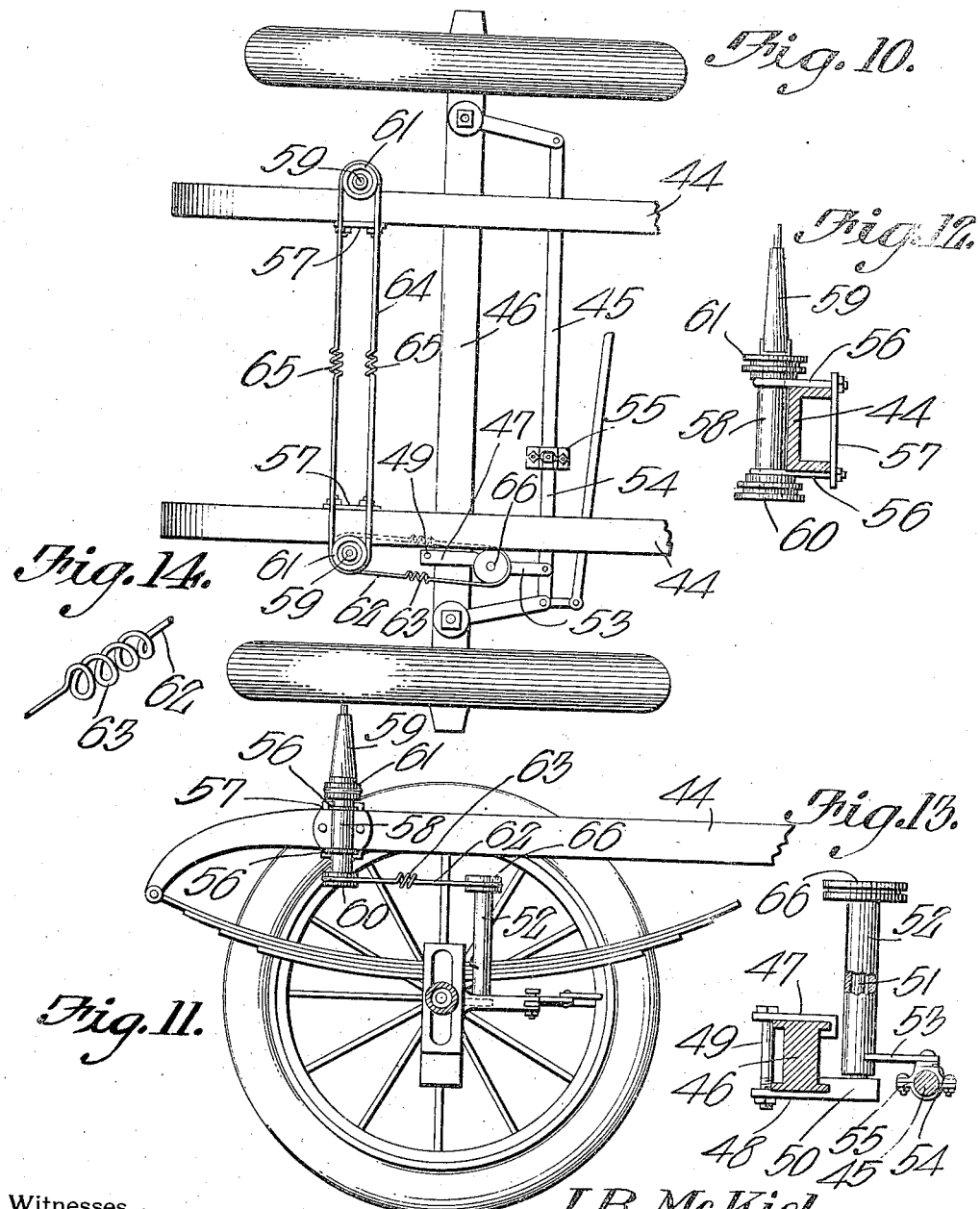

UNITED STATES PATENT OFFICE.

JAMES B. McKIEL, OF MARSHALL, TEXAS.

HEADLIGHT FOR AUTOMOBILES.

1,024,411.    Specification of Letters Patent.    Patented Apr. 23, 1912.

Application filed October 26, 1911. Serial No. 656,854.

*To all whom it may concern:*

Be it known that I, JAMES B. McKIEL, a citizen of the United States, residing at Marshall, in the county of Harrison and State of Texas, have invented a new and useful Headlight for Automobiles, of which the following is a specification.

The present invention aims, broadly speaking, to provide a means whereby a rotatably mounted, vehicle-carried lamp may be swung horizontally, by the action of the steering rod of a vehicle, the operation being such that when the wheels of the vehicle are turned, to round a curve, the lamp will be shifted, so as to follow the curve which the vehicle is traversing.

A further object of the invention is to provide a novel form of vehicle-carried means, adapted, at once, for connection with the steering rod of a vehicle, and with mechanism whereby the lamp is supported.

A further object of the invention is to provide novel means whereby the lamp controlling mechanism may, alternately, be rendered operative and inoperative, the construction being such that, at times, the steering rod may be operated, without effecting a movement of the lamp.

A further object of the invention is to improve generally, and to increase the utility of devices of the type to which the present invention appertains.

With the foregoing and other objects in view, which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

Figure 1:
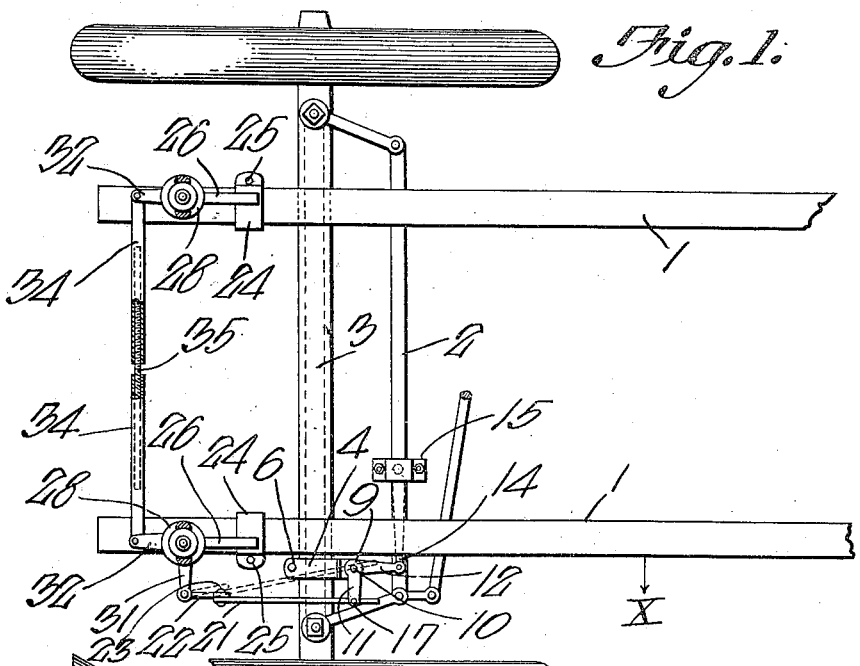
Figure 2:
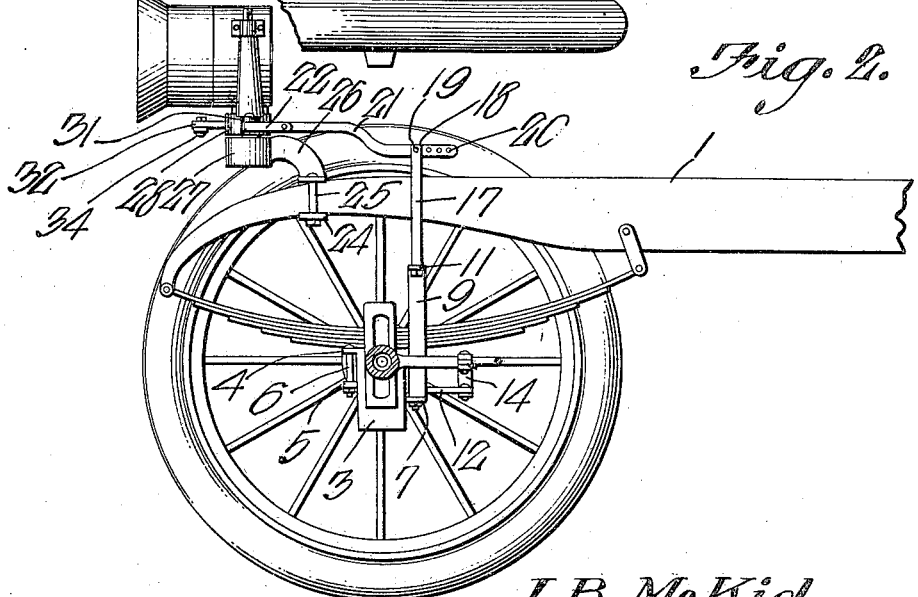

In the accompanying drawings,—Figure 1 shows in top plan, a lamp-controlling mechanism constructed in accordance with the present invention; Fig. 2 is a side elevation of the structure depicted in Fig. 1; Fig. 3 is a vertical section taken along the outer face of the chassis, looking in the direction of the arrow X in Fig. 1; Fig. 4 is a rear elevation of the structure whereby the lamp controlling mechanism is operatively connected with the steering rod; Fig. 5 is a sectional elevation of the lamp bracket; Fig. 6 is a plan of a modified form of element, adapted to connect the lamps at opposite sides of the vehicle; Fig. 7 is a plan of the element shown in Fig. 6, the view points in Figs. 6 and 7 being at right angles; Fig. 8 is a transverse section of a portion of the chassis, the view showing in elevation, the securing means whereby the clamp-carrying bracket is assembled with the chassis; Fig. 9 is a transverse section of the axle, the view showing in elevation, a modified means for connecting with the axle, that portion of the mechanism which appears in Fig. 4; Fig. 10 is a top plan showing a modified form of the invention; Fig. 11 is a side elevation of the structure appearing in Fig. 10; Fig. 12 is a transverse section of the chassis, the view showing in elevation, the mechanism whereby the lamp is immediately supported for rotation; Fig. 13 is a transverse section of the axle, the view showing in elevation, that portion of the mechanism whereby the lamp-controlling means is operatively connected with the steering rod; and Fig. 14 is a detail perspective of a portion of one of the resilient belts which enter into the construction of that form of the invention which appears in Fig. 10.

In the accompanying drawings, the numeral 1 denotes generally, the chassis of a vehicle, the numeral 2 denoting the steering rod, and the numeral 3 denoting the axle.

Noting Fig. 1, and referring to Fig. 3 for a clearer understanding of details, it will be observed that the axle 3 carries a clamp, comprising a top member 4 and a bottom member 5, united by a connecting bolt 6, one end of the bottom member 5 projecting beyond the axle 3, as denoted by the numeral 7. Fixed to and rising from the projecting end 7 of the bottom member 5, is a spindle 8, upon which is mounted for rotation a sleeve 9, one end of the spindle protruding beyond the upper end of the sleeve 9, as denoted by the numeral 10. Projecting transversely of the vehicle from the upper end of the sleeve 9 is a primary arm 11, and projecting longitudinally of the vehicle, from the lower end of the sleeve 9, is a secondary arm 12. The arms 11 and 12, together with the sleeve 9 with which they are assembled, constitute a bell crank, or a lever of the first order. The rear end of the secondary arm 12 is pivotally connected with a link 14, extended transversely of the vehicle, the inner end of the link 14 being pivotally connected with a clamp 15 which is removably and adjustably mounted upon the steering rod. Fixed to and rising from the outer end of the primary arm 11, is a spindle 16, on which is removably mounted for rotation, a sleeve 17, bifurcated at its upper end, as shown at 18, a bolt 19 being extended through the bifurcations 18, to receive and support pivotally, one portion of a lamp-controlling member, this lamp-controlling member being a two-part structure, and comprising a primary part 21 and a secondary part 22, pivotally connected at their adjacent ends, as shown at 23, there being in the primary part 21, a plurality of openings 20, in which the pivot bolt 19 may be mounted successively.

A means is provided for mounting a rotatably carried clamp upon the vehicle frame. This means, as shown most clearly in Fig. 8, comprises a pair of clamps 24, adapted to engage the chassis 1, the clamps 24 being united by a connecting bolt 25. Fixed to and rising from the upper clamp 24, is a forwardly extended goose neck 26, carrying a head 27 upon which is rotatably supported the lamp-carrying bracket 28, a connecting bolt 29 passing through the bracket and entering the head 27, to serve as a pivotal mounting for the bracket. Interposed between the head of the bolt 29 and the bracket 28 and between the bracket 28 and the head 27, are anti-friction balls 30; and at this point it may be stated that any of the movably connected parts of the structure may be equipped with the anti-friction balls 30, the use of these elements being common and well known and requiring no specific delineation, over and above the showing of Fig. 5. Projecting from the head 28, transversely of the vehicle, is an outstanding arm 31 which is pivotally connected with the secondary part 22 of the lamp-controlling member. The clamps 24 and the lamp-supporting brackets 28 are located at both sides of the vehicle, as Fig. 1 will render evident. Each of the brackets 28 is equipped with a forwardly projecting arm 32, and to these arms 32 are pivoted the remote ends of a pair of tubes 34, into the adjacent ends of which is right and left hand threaded, a screw 35, the screw 35, obviously, being manipulable, to shorten and to lengthen the connection between the arms 32, so that the lamp brackets 28 upon both sides of the vehicle will turn properly, when the device is operated in a manner to be described hereinafter.

Broadly considered, the invention includes a movably supported operating member embracing the sleeve 9 and the arms 11 and 12. This movably supported member is fulcrumed intermediate its ends and may be considered as a lever. The means for operating this lever member comprises the link 14 and the clamp 15. The lamp-controlling mechanism terminates in the rod 21, interengaging elements being provided for removably connecting the lamp-controlling mechanism with the movable member. These elements include the sleeve 17 and the spindles 16 and 10. The element is located at the fulcrum of the movable member above described, the element 16 being eccentrically disposed with respect to the fulcrum of the movable member.

In Figs. 6 and 7, a modified means is shown whereby the arm 32 of the two lamp brackets may be detachably connected. Referring to Figs. 6 and 7, it will be seen that the members 34 and 35 may be replaced by a bar 36, flattened at its ends as shown at 37, and provided in its flattened portions with a plurality of openings 38, these openings 38 permitting the effective length of the bar 36, between the arms 32, to be increased and shortened at will.

In Fig. 9 of the drawings, a modified means is shown, whereby the sleeve 9 may be rotatably supported upon the axle 3. This modified supporting means, shown in Fig. 9, embraces an arched clip 39, and a bottom clip 40, the spindle 8 being passed through the overlapped ends 41 of the members 39 and 40. The member 39 may be equipped at one end with a threaded lug 42, adapted to pass through the clip 40, there being a nut 43 mounted upon the threaded lug 42.

In Fig. 10 and following, I have shown a modified form of the invention. Referring to these figures, the numeral 44 denotes the chassis, the numeral 45 denoting the steering rod, and the numeral 46 denoting the axle. Noting Fig. 13, it will be observed that the axle 46 is engaged by a clamp, comprising a top member 47 and a bottom member 48, these members being connected by a bolt 49, the bottom member 48 having an outwardly projecting portion 50, in which is secured a spindle 51, upon which is rotatably mounted a vertical sleeve 52, carrying at its upper end a sheave 66. Adjacent its lower end, the sleeve 52 is equipped with a rearwardly projecting arm 53, to which is pivoted a link 54, the link 54 being pivotally connected with a clamp 55, mounted upon the steering rod 45. The outstanding primary arm 11, shown in Fig. 4, is represented in Fig. 13 by the sheave 66, and, broadly speaking, the elements 52, 53 and 66 comprise a bell crank which is fulcrumed upon the spindle 51.

Noting particularly Fig. 12, it will be seen that the chassis 44 is included between a pair of U-bolts 56, united with a back plate 57, the U-bolts 56 embracing a bearing 58, in which is journaled for rotation a lamp-carrying shaft 59, equipped at its lower end with a bottom sheave 60, and intermediate its ends, above the uppermost U-bolt 56, with an upper sheave 61. A resilient belt 62 is engaged about the sheaves 60 and 66, and this belt 62 may be equipped with an intermediate, helical spring portion 63, as clearly shown in Fig. 14.

As will be readily understood, duplicate mechanisms are provided, whereby the lamp-carrying shafts 59 are duplicated at both sides of the vehicle, the sheaves 61 being connected by a belt 64, extended transversely of the vehicle, the belt 64 being provided in both of its runs, with helical spring portions 65.

Passing now to a description of the operation of that form of the invention which appears in Fig. 1, it will be understood that when the steering rod 2 is moved longitudinally, to effect a swinging of the wheels of the vehicle, as takes place when the vehicle rounds a curve, the link 14, which is connected with the steering rod 2 through the instrumentality of the clamp 15, will move, along with the steering rod 2, the link 14 swinging the secondary arm 12 horizontally, the arm 12 causing a rotation of the sleeve 9 upon the spindle 8, the rotation of the sleeve 9 causing a movement of the primary arm 11, in a horizontal plane, the arm 11 drawing upon the connected parts 21 and 22, these parts 21 and 22 operating upon the arm 31, and causing a rotation of the lamp-supporting bracket 28 at one side of the vehicle. This lamp-supporting bracket 28, when thus rotated, will, through the instrumentality of the forwardly projecting arm 32, the members 34 and 35, and the arm 32 at the opposite side of the vehicle, cause a synchronous movement in the lamp-carrying bracket which is located upon the last mentioned side of the vehicle. From the foregoing it will be seen that when the steering rod 2 is shifted longitudinally, both of the vehicle-carried lamps will be turned accordingly, so that the lamps will follow the curve which the vehicle is rounding.

As will be readily understood, the operation hereinbefore described, should take place only, when the lamps are lighted. In the day time, a movement of the lamps is not necessary or desirable, such a movement, in the day time, serving to wear out certain constituent portions of the structure, without effecting any good purpose. In the day time, therefore, or under other conditions when it is not desired to turn the lamps, the sleeve 17 may be lifted off the spindle 16, and be placed upon the spindle 10. When the sleeve 17 is mounted upon the spindle 16, the lamps will be operated, because the spindle 16 is eccentrically disposed with respect to the center of rotation of the sleeve 9. When, however, the sleeve 17 is mounted upon the spindle 10, the lamps will not be operated, because of the fact that the spindle 10 is located at the axis of rotation of the sleeve 9. In other words, the spindle 10 constitutes a fulcrum for the bell crank lever comprising the elements 11, 9 and 12.

Referring to the operation of that form of the invention which is depicted in Fig. 10, it will be understood that when the steering rod 45 is moved longitudinally, the clamp 55 will be moved accordingly, the clamp 55 carrying with it, the link 54, the link 54 operating the arm 53 and causing a rotation of the sleeve 52 upon the spindle 51, a rotation of the sleeve 52 resulting in a rotation of the sheave 66 which is carried by the upper end of the sleeve, the sheave 66 operating the yieldable belt 62, the belt 62 engaging the lower sheave 60 of the lamp-carrying spindle 59, and causing a rotation of the lamp-carrying spindle 59, and a consequent movement of that lamp located upon the corresponding side of the vehicle. Since the lamp-carrying spindles 59 are operatively connected by means of the transverse, spring belt 64, the lamps upon both sides of the vehicle will be operated simultaneously, when the steering rod 2 is shifted. Owing to the fact that the belts 64 and 62 are equipped with the spring portions 65 and 63, respectively, these belts will be maintained engaged with the treads of the sheaves whereon they are mounted. Moreover, the spring portions 65 and 63, will permit the belts to yield sufficiently so that the mechanism will continue to operate, notwithstanding the independent movements of various parts of the vehicle frame.

Having thus described the invention, what is claimed is:—

1. In a device of the class described, a member adapted to be removably secured to the steering rod of a vehicle; a member adapted to be removably secured to a fixed portion of the vehicle; a vertical sleeve supported for rotation upon the second specified member and provided with upper and lower eccentric portions; a link pivotally uniting the lower of said portions with the rod-carried member; and means for operatively connecting the upper of said portions with a movably mounted, vehicle-carried lamp.

2. In a device of the class described, a member adapted to be removably secured to the steering rod of a vehicle; a member adapted to be removably secured to the axle of a vehicle; a vertical sleeve supported for rotation upon the axle-carried member and provided with upper and lower eccentric portions; a link pivotally uniting the lower of said portions with the rod-carried member; a rotatably mounted lamp support; and a connection between the lamp support and the upper of said eccentric portions, the connection being yieldable intermediate its point of connection with the lamp support and with the upper of said eccentric portions.

3. In a device of the class described, a clamp adapted to be secured to the steering rod of a vehicle; a clamp adapted to be secured to the axle of a vehicle; a spindle fixed to and rising from the axle clamp; a sleeve rotatable upon the spindle; means for operatively connecting the sleeve with a rotatably mounted, vehicle-carried lamp; an arm projecting from the sleeve; and a link pivotally connecting the arm with the rod clamp.

4. In a device of the class described, a movably supported operating member having a fulcrum; means for operating said member; lamp-controlling mechanism; and interengaging elements upon the lamp-controlling mechanism and upon the movable member, for removably connecting the lamp-controlling mechanism with the movable member; one element being at the fulcrum of the movable member, and another element being eccentrically disposed with respect to the fulcrum.

5. In a device of the class described, a movably supported operating member having a fulcrum; means for operatively connecting said member with the steering rod of a vehicle; lamp-controlling mechanism; and interengaging elements upon the lamp-controlling mechanism and upon the movable member, for removably connecting the lamp-controlling mechanism with the movable member; one element being located at the fulcrum of the movable member, and another of said elements being eccentrically disposed with respect to the fulcrum.

6. In a device of the class described, a lever; means for fulcruming the lever upon a vehicle; means for operatively connecting the lever with the steering rod of a vehicle; lamp-controlling mechanism; and elements adapted to connect the lamp-controlling mechanism operatively with the lever, one of said elements being located at the fulcrum of the lever, and another of said elements being eccentrically disposed with respect to the fulcrum of the lever, the lamp-controlling mechanism being adapted for interchangeable connection with said elements.

7. In a device of the class described, a member adapted to be mounted upon a fixed portion of a vehicle; a spindle fixed to and rising from said member; a lever fulcrumed upon the spindle, the spindle protruding through the lever; a spindle mounted upon the lever and spaced from the fulcrum of the lever; a sleeve adapted to be interchangeably mounted upon the spindles; means for connecting the sleeve with a vehicle carried, movably mounted lamp; and means for operatively connecting the sleeve with the steering rod of a vehicle.

8. In a device of the class described, a member adapted to be secured to a fixed portion of a vehicle; an element fixed to and rising from said member; a lever fulcrumed upon said element; a second element carried by the lever and spaced from the fulcruming element; lamp-controlling means adapted for removable connection with said elements alternately; and means for operating the lever.

9. In a device of the class described, a member adapted to be secured to a fixed portion of a vehicle; an element fixed to and rising from said member; a lever fulcrumed upon said element; a second element carried by the lever and spaced from the fulcruming element; lamp-controlling means adapted for removable connection with said elements alternately; and means for operatively connecting the lever with the steering rod of a vehicle.

10. In a device of the class described, a clamp adapted to be secured to a vehicle axle; a spindle fixed to and rising from the clamp; a member adapted to be secured to the steering rod of a vehicle; a sleeve journaled for rotation upon the spindle, the spindle protruding through the sleeve, there being angularly disposed arms projecting from the sleeve; a link connecting one of said arms with the rod-carried member; a spindle fixed to and rising from the other of said arms; a sleeve adapted to be interchangeably mounted upon the spindles; and means for connecting the last mentioned sleeve with a rotatably mounted, vehicle-carried lamp.

In testimony that I claim the foregoing as my own, I have hereto affixed my signature in the presence of two witnesses.

JAMES B. McKIEL

Witnesses:
S. L. LANGLEY,
G. H. LANGLEY.